United States Patent [19]
Sinner

[11] 3,827,767
[45] Aug. 6, 1974

[54] HYDROSTATIC BEARING
[75] Inventor: Karl-Helmut Sinner, Dortmund-Hochsten, Germany
[73] Assignee: Hoesch Werke Aktiengesellschaft, Dortmund, Germany
[22] Filed: Jan. 29, 1973
[21] Appl. No.: 327,586

[52] U.S. Cl. .................................................. 308/9
[51] Int. Cl. ............................................ F16c 17/16
[58] Field of Search ................................. 308/9, 122

[56] References Cited
UNITED STATES PATENTS
3,290,065  12/1966  Porath .............................. 308/122
3,711,167  1/1973  Ennis ................................. 308/122

Primary Examiner—Charles J. Myhre
Assistant Examiner—Frank Susko
Attorney, Agent, or Firm—Michael S. Striker

[57] ABSTRACT

A hydrostatic bearing is constructed as a self-contained unit, including an outer bearing ring, an inner bearing ring, a support ring beneath the bearing rings for supporting the same, a plurality of pressure-oil chambers between the respective rings with these chambers being of different dimensions in dependence upon whether they are to counteract an axial, radial or tilting force component, and oil passages which communicate separately with the chambers for filling the same with oil under pressure.

7 Claims, 3 Drawing Figures

3,827,767

HYDROSTATIC BEARING

BACKGROUND OF THE INVENTION

The present invention relates generally to a hydrostatic bearing, and more particularly to a hydrostatic bearing which is capable of simultaneously withstanding axial, radial and tilting force components.

In many instances hydrostatic bearings are required for the support of very heavy components, such as radar antennas, telescopes and other heavy elements which are both turnable and pivotable. Many such installation requirements carry with them specifications as to ease of movement, precision of movement, rigidity and damping effect which exceed the capability of large antifriction bearings, so that recourse must be had to hydrostatic bearings.

Hydrostatic bearings are, of course, not new. It is known to provide them as purely axial bearings, as inclined bearings or as spindle bearings which have cylindrical and planar or conical or spherical working surfaces. The working surfaces of the bearing rings of such bearings may have several oil pockets formed in them into which pressure oil is introduced. The use, construction and operation of such hydrostatic bearings is already well known, but it is also well known that heretofore the bearings of this type which have become known in the art have not been entirely satisfactory.

SUMMARY OF THE INVENTION

It is, accordingly, a general object of the present invention to provide an improved hydrostatic bearing which avoids the disadvantages of the prior art. More particularly it is an object of the invention to provide an improved hydrostatic bearing which is a self-contained unit that can be installed and removed in toto.

An additional object of the invention is to provide such a hydrostatic bearing which can simultaneously withstand axial, radial and tilting force components. This is, in fact, an important object of the invention.

Another object of the invention is to provide such a hydrostatic bearing which is capable of smooth movement without "jerking" movements, which has little resistance to turning and which provides for the required precision in its movement.

Another object of the invention is to provide such a bearing which has an open center, that is which is annular.

In keeping with these objects, and with others which will become apparent hereafter, one feature of the invention resides in a hydrostatic bearing capable of withstanding simultaneous axial, radial and tilting force components. The bearing comprises a self-contained unit including an outer bearing ring, an inner bearing ring, a support ring beneath the bearing rings for supporting the same, and a plurality of pressure-oil chambers beneath the respective rings, these chambers being of different dimensions in dependence upon which of the force components the particular chamber is to counteract. Oil passages communicate separately with the chambers for feeding the same with oil under pressure. These oil passages are, of course, adapted for connection to a source of oil under pressure.

The chambers and the oil passages may all be provided in the material of the inner bearing ring and of the support ring, but according to a further concept of the invention, it is possible to provide in the inner bearing ring and in the support ring only some of the inlet and outlet oil passages, whereas the interface of the various rings is provided with a respective layer of synthetic plastic material in which the oil chambers and some portions of the passages are formed.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawing.

DESCRIPTION OF THE PREFERRED EMBODIMENTS

Figure 1:
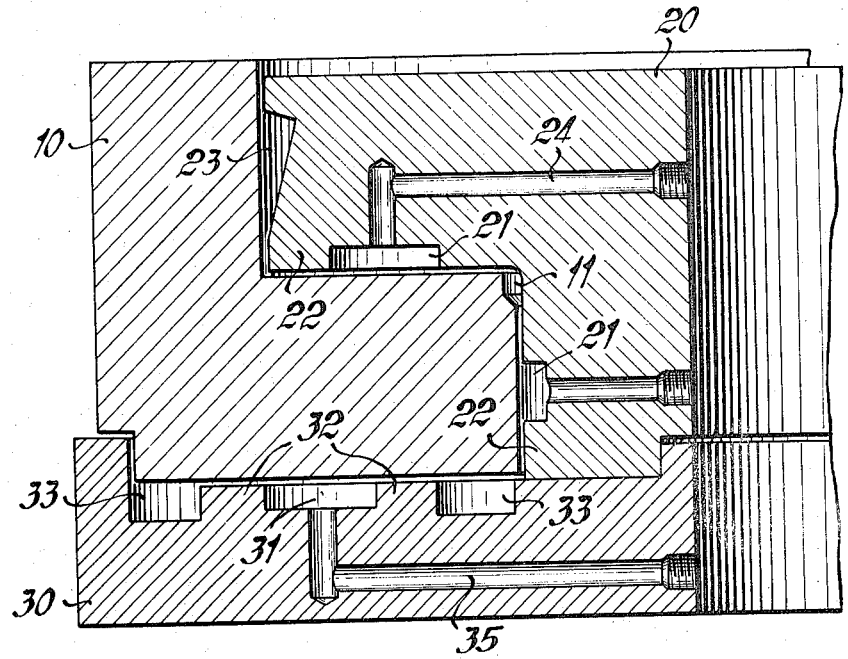
FIG. 1 is an axial section taken through one side of an annular hydrostatic bearing according to the present invention, showing the oil supply or inlet passages.
Figure 2:
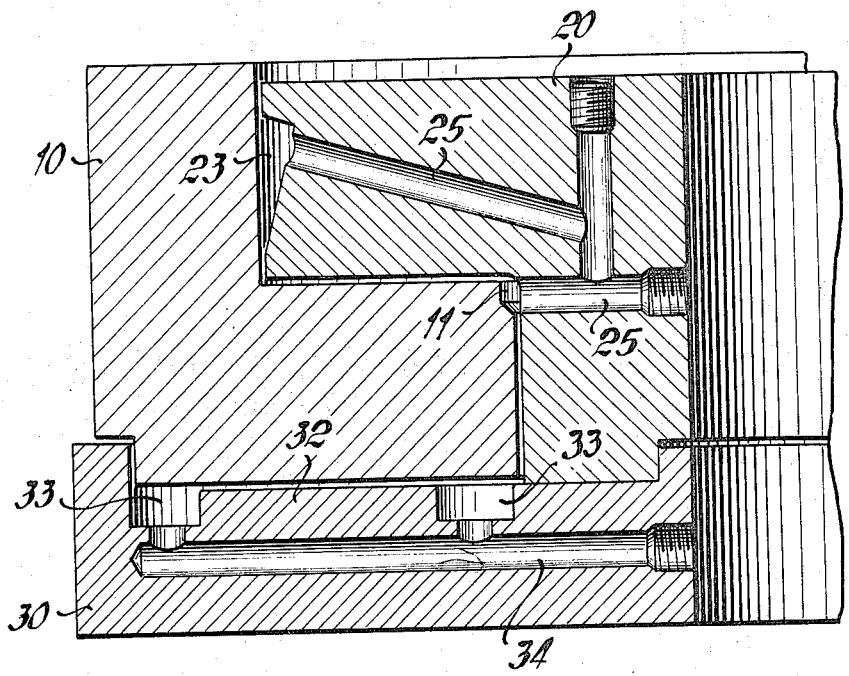
FIG. 2 is a section taken through the bearing of FIG. 1 but showing the oil return-flow passages.

Discussing now firstly the embodiment of FIGS. 1 and 2 it will be seen that the novel bearing according to the present invention is configurated as a self-contained unit that can be installed and removed in toto. It has an outer annulus or ring 10, an inner annulus or ring 20 and a carrying annulus or ring 30. The cross-section of the bearing corresponds to the known bearing rings of ball-type bearings.

As FIG. 1 shows, the outer ring 10 is provided with an annular return-flow groove 11 for spent pressure oil. The inner ring 20 and the carrying ring 30 are provided in their respective surfaces as shown with pressure oil chambers 21, 31, respectively, which are bounded by annular ribs 22 and 32, respectively. In addition, the inner ring 20 is provided with a return-flow groove 23 and with supply passages 24 as well as with return-flow passages 25 for the oil (see FIG. 2). That Figure also shows that the bearing ring 30 is provided with return-flow grooves 33 which communicate with a return-flow passage 34 for the oil and with an inflow passage 35.

It will be appreciated that a bearing of this type will be accommodated in an oil pan which surrounds the bearing and whose purpose is to receive oil which flows out of the bearing and to conduct it back into the oil reservoir. Such an oil pan has not been shown, not being a direct pan of the bearing; also omitted for the sake of clarity and because they do not constitute a direct part of the bearing are pumps, armatures, an oil cooler and other components.

Figure 3:
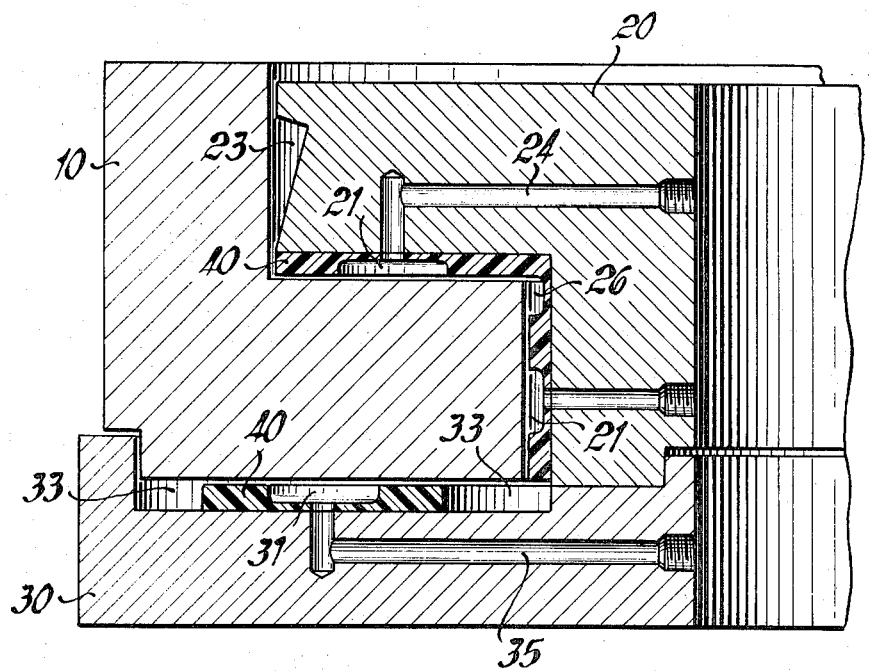
FIG. 3 is a view similar to FIG. 1 but illustrating a further embodiment of the invention.

The bearing shown in FIG. 3 is generally the same as that in FIG. 2, except for certain changes which will be discussed presently. To produce the bearing of FIG. 3 the outer ring 10 is radially adjusted with respect to the carrier ring 30 and the space between them has synthetic plastic material 40 poured into it. Before this is done, space-holding components (for instance made of wax or the like) are put in this space where the formation of the chamber 31 and of the grooves 33 is desired. When the plastic 40 is thereupon poured into the space it will fill the remainder of the space but evidently not those portions where the space-holding components are located. After the plastic 40 is hardened, the ring 10 is directly deposited on the layer 40 and thereupon the inner ring 20 is threadedly connected with the carrying ring 30 (not shown because well known) and the remaining hollow space is then also filled up with synthetic plastic material after again appropriate space-holding components have been provided in it, in order to hold the spaces for the formation of the chambers 21 and the groove 26. The amount of shrinkage which occurs during the hardening of the plastic provides for the axial and the radial play of the bearing, which play is precisely determined by the appropriate dimensioning of the distances between the outer ring 10 and the carrying ring 30, or by the selection of appropriate synthetic plastics whose amount of shrinkage is so well known that from it the desired amount of play can be calculated.

It should be noted that various synthetic plastics can be used for the purpose, epoxy resins being particularly advantageous because of their good mechanical characteristics and because of their good ability to reproduce the outer contours of the space-holding components which must, of course, be removed after hardening of the plastic.

When the bearing is subsequently assembled and the oil chambers are placed under pressure during assembly, a high degree of protection against binding of the bearing during installation is obtained.

The invention achieves important advantages. In particular, the novel bearing has a greater stiffness and rigidity compared to antifriction bearings. In addition, start-up and shut-down friction are eliminated, which makes it possible to operate the bearing at minute speeds and to impart to it oscillatory movements. No wear of the glide surfaces is observed, and the accuracy of movement is particularly good. Also, the ability to support loads and the life of the bearing are independent of the material of the bearing itself and the only friction that develops during operation of the bearing is the relatively low liquid friction of the pressure oil.

Thus the bearing according to the present invention can operate at high speed or at very low speed, without influencing its life. It operates very quietly and the damping effect is higher than in the case of antifriction bearings. Moreover, the glide surfaces of the novel bearing need not be anywhere near as accurately produced as in other types of bearings, and in particular any hardening, grinding or other similar treatment of the surfaces is not necessary with the resultant savings in terms of labor. The bearing according to the present invention can be used in almost all applications, for instance in tooling machines, in cranes, in drag lines, in the erection of antennas, and in many other fields of application.

It will be understood that each of the elements described above, or two or more together, may also find a useful application in other types of constructions differing from the types described above.

While the invention has been illustrated and described as embodied in a hydrostatic bearing, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various purposes and applications without omitting features that from the standpoint of prior art fairly constitute essential characteristics of the generic or specific features of this invention and, therefore, such modifications and adaptations should and are intended to be comprehended within the meaning and range of equivalence of the following claims.

What is claimed as new and desired to be protected by Letters Patent is set forth in the appended claims:

1. A hydrostatic bearing capable of withstanding simultaneous axial, radial and tilting force components, comprising a self-contained unit including an outer bearing ring, an inner bearing ring at least partially accommodated within the inner circumference of said outer bearing ring, a support ring beneath said bearing rings for supporting said bearing rings, a plurality of hydraulic pressure fluid chambers between the respective rings for counteracting said force components and being dimensioned in dependence upon which of said force components said chambers are to counteract, and hydraulic fluid passages communicating with said chambers for feeding said chambers with hydraulic fluid under pressure, said passages being adapted for connection with a source of hydraluic fluid under pressure.

2. A hydrostatic bearing as defined in claim 1, wherein respective ones of said chambers and passages are provided in said outer and inner bearing rings and said support ring.

3. A hydrostatic bearing as defined in claim 1, said inner bearing ring and said support ring having exposed surfaces; further comprising layers of synthetic plastic material on said exposed surfaces; and wherein said chambers and some of said passages are formed in said layers of synthetic plastic material.

4. A hydrostatic bearing as defined in claim 3, the remainder of said passages being formed in said inner bearing ring and said support ring, respectively.

5. A hydrostatic bearing as defined in claim 3, wherein said synthetic plastic material is an epoxy resin.

6. A hydrostatic bearing as defined in claim 1, wherein said passages communicate separately with said chambers.

7. A hydrostatic bearing as defined in claim 1, wherein said hydraulic fluid is oil.

* * * * *